(No Model.)
2 Sheets—Sheet 1.

D. F. MILLER.
STAVE DRESSING MACHINE.

No. 500,666. Patented July 4, 1893.

Attest
J. J. Martin

Inventor
Daniel F. Miller
by Chas. Spengel Atty.

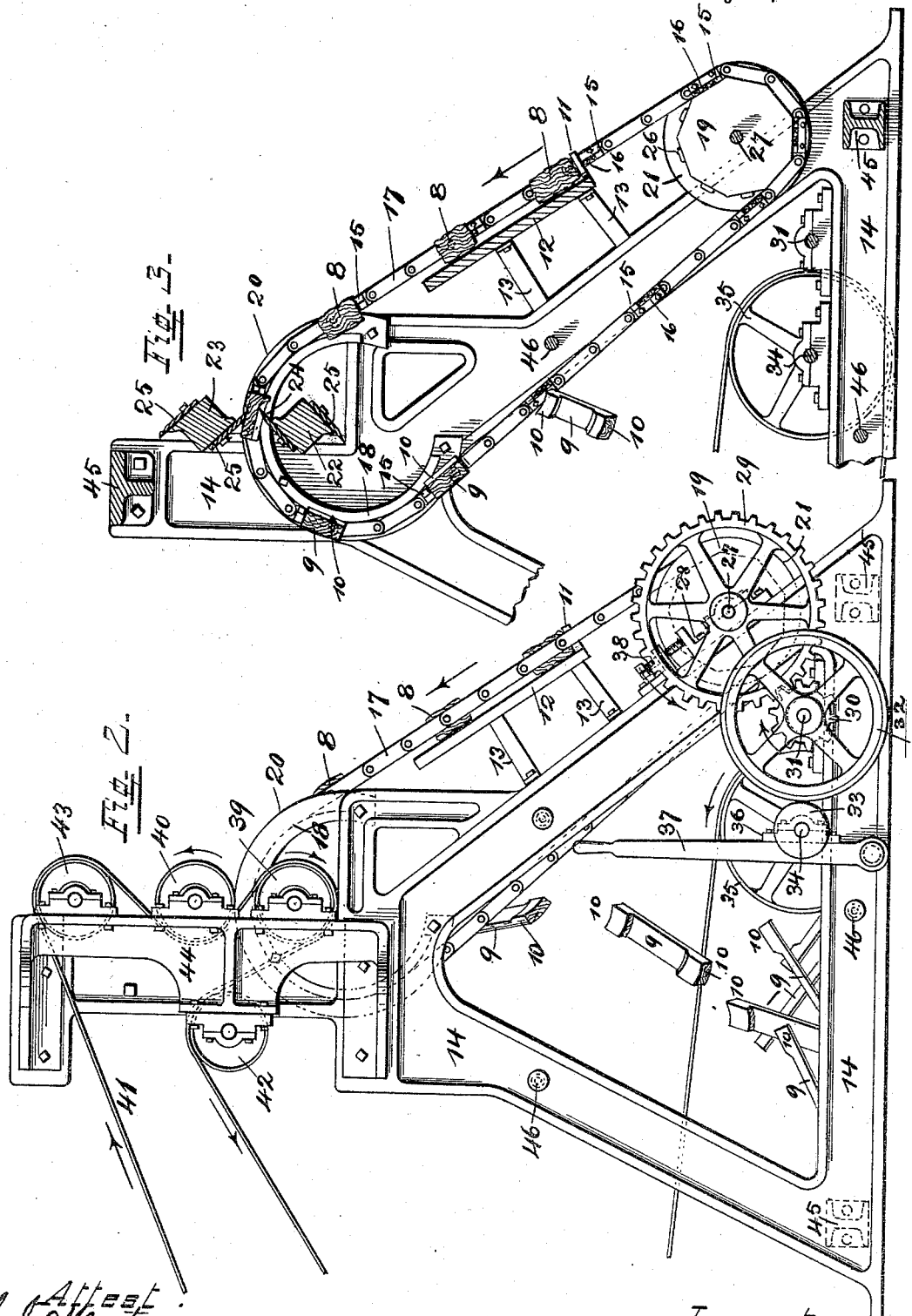

UNITED STATES PATENT OFFICE.

DANIEL F. MILLER, OF LEROY, ASSIGNOR OF ONE-HALF TO GEORGE V. FRAZIER AND WALTER ELROD, OF SOMERSET, KENTUCKY.

STAVE-DRESSING MACHINE.

SPECIFICATION forming part of Letters Patent No. 500,666, dated July 4, 1893.

Application filed August 29, 1892. Serial No. 444,418. (No model.)

*To all whom it may concern:*

Be it known that I, DANIEL F. MILLER, a citizen of the United States, residing at Leroy, in the county of Pulaski and State of Kentucky, have invented certain new and useful Improvements in Stave-Dressing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines for cutting and shaping staves such as are used in the manufacture of kegs, barrels and other similar cooperage. It belongs to that class which dress the staves at once on both sides, provide a thicker portion near each end to furnish sufficient thickness and strength at the points where the croze is cut in, the thinness so resulting between the ends also facilitating their bending and finally they give the staves the desired curve, corresponding with the diameter of the particular size of cooperage for which they are intended.

The novel features of this invention reside in the cutter-heads which reduce the rough stave to its proper thickness, dress it on both sides and give it the thicker ends, respectively reduce its thickness between the latter; the feed-mechanism which holds and carries the stave past the cutter-heads; the mechanism which causes the stave to become curved as explained above and the general construction and the combination of all these parts with each other.

In the following specification and claims is found a full description of the machine as improved by me, its operation, parts and construction, which latter is illustrated in the accompanying drawings in which—

Figure 1:
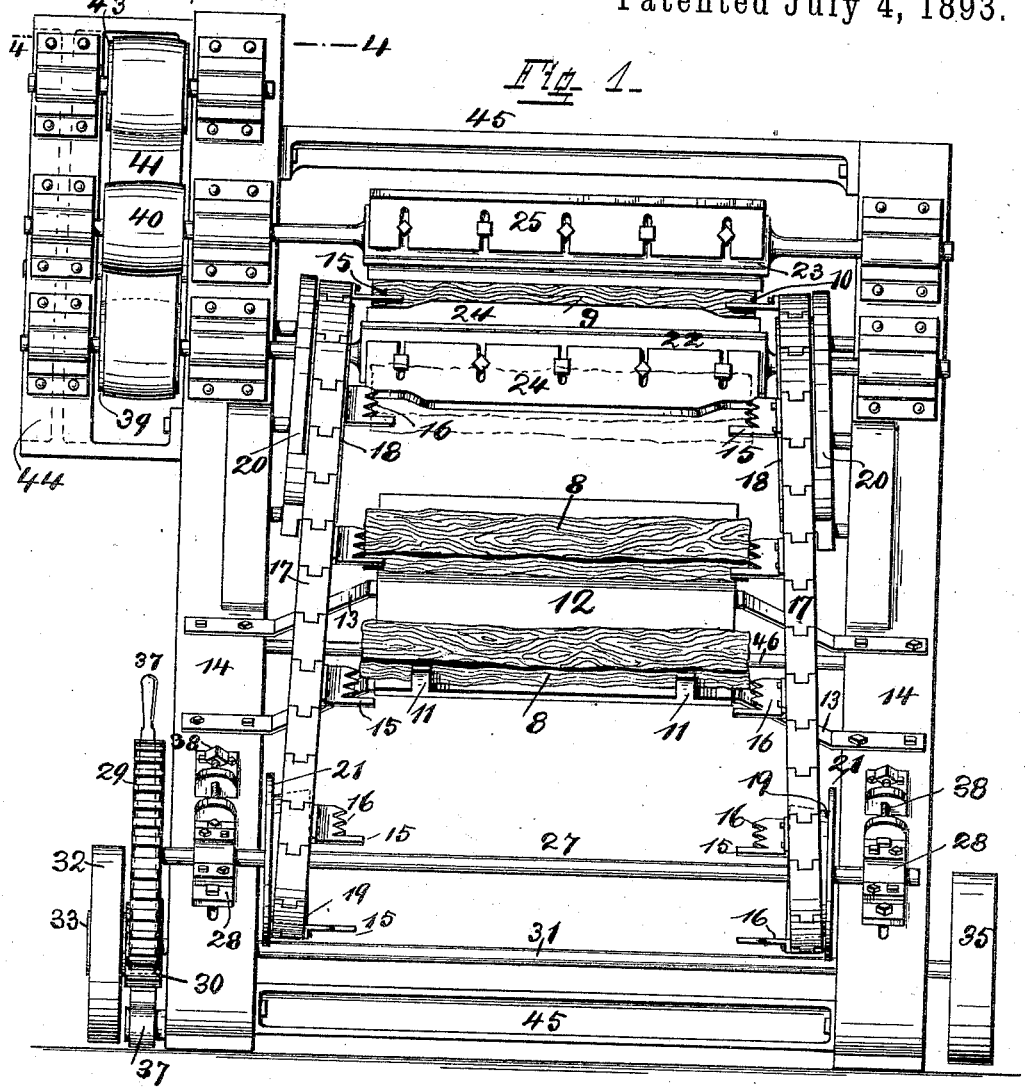
Figure 4:
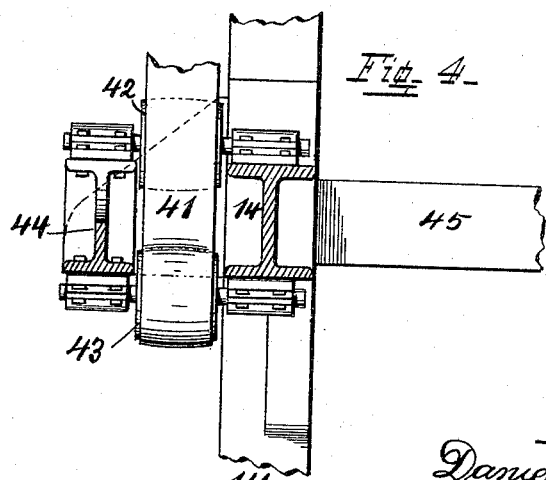

Figure 1 is a front and Fig. 2 a side-view of the same. Fig. 3, is a vertical section taken between the standards or side-frames and Fig. 4, is a horizontal section taken on line 4—4, of Fig. 1.

The staves before being operated upon by this machine consist of rough blocks of wood as shown and indicated by numeral 8. After being reduced and shaped they appear like shown in Fig. 2, and indicated by 9, 10, 10, being the thicker ends. The rough stave is placed against stops 11, of a feed-table 12, which by legs 13, is secured to the two standards or sides 14, which constitute the general machine-frame. This position brings the ends of the stave within the path of inwardly projecting fingers 15, of grippers 16, which at suitable intervals are secured to the feed-chains 17. These latter are endless chains, passing over circular guides 18 secured to the inner sides of the machine-frame. They are driven by pulleys 19, of polygonal circumference, the length of each one of the sides corresponding with the length of the links of the chains. They converge as they approach their highest position which is accomplished by setting guides 18, inclined and also having the face of pulleys 19, correspondingly inclined. To prevent the chains from spreading apart flanges 20, and 21, are provided on guides 18, and pulleys 19, respectively. The effect of this convergency of the chains causes grippers 16, to approach each other and thereby taking a hold of the staves between them, into the ends of which latter their teeth become firmly embedded. This engagement commences before the stave has left table 12, whereby it is prevented from falling off of fingers 15, and it becomes complete at the point where the chains are the closest and where also the cutter-heads perform their work. There are two of these latter, 22, and 23, between which the chains pass, carrying with them the staves which latter pass through the space between knives 24, and 25, secured to said cutter-heads. The lower cutter-head 22, dresses the inside of the stave, providing also for the thicker ends 10, of the same,—for which purpose knife 24, is shaped accordingly. The upper cutter-head 23, dresses the outside of the stave which, being perfectly straight, requires a straight knife as shown at 25. After chains 17, have carried the stave up from table 12, and at their closest position passed it through between the knives of the cutter-heads, they spread again which causes the grippers to move apart and release the stave, which is finished now. The required curve is produced by guide 18, which is of circular shape, its size being so that the chains while passing over it turn on a circle the diameter of which is equal to the diameter of the package for which the stave is intended. The latter thus occupies a position which is similar to the one it will occupy when assembled with other staves to form a complete vessel and being passed through the cutter-heads while in such position and following the curve of guides 18, it will as a matter of course receive the correct circular shape.

The thickness of the staves is regulated by the position of the knives which are adjustably secured to the cutter-heads and may be moved toward or from each other. The length of the thicker end-portions of the staves is determined by the shape of the knives 24, on the lower cutter-head. The machine is adapted to receive shorter staves by the substitution of longer grippers which extend farther inwardly. Pulleys 19, are provided with projections 26, on their faces which engage with indentations in the under side of the links of the chains and thereby secure a better contact. They are mounted upon a shaft 27, supported in boxes 28, and carrying at its outer end a gear-wheel 29, by which it is rotated. Gear-wheel 29 receives its motion from a pinion 30, on shaft 31, actuated by friction-gearing 32, 33, from a shaft 34, rotated by the power-driven pulley 35. One of the boxes 36, of shaft 34, is connected to a lever 37, whereby this shaft is capable of a slight vibration by which the friction-gearing 32, 33, may be connected or severed for the purpose of starting or stopping the feed-mechanism. This part of the machine may be modified to suit circumstances and speeds required and a clutch-mechanism may be substituted for the separable friction-gear shown.

Boxes 28, are sliding boxes and by means of screws 38, may be adjusted to regulate the tension of the feed-chains.

The cutter-head-shafts have pulleys 39, and 40, connected to them which are driven by a belt 41. Idlers or guide-pulleys 42, 43, are provided for the purpose of enabling belt 41, to engage with pulleys 39, 40, in such a way as to cause them to revolve in opposite directions.

The outer boxes of the cutter-head shafts and idler-shafts are secured to a laterally extending, auxiliary frame or bracket 44, which is bolted to the outside of one of the large frame-sections 14.

45, are braces and 46, tie-rods, whereby the large frame-sections are connected.

Having described my invention, I claim as new—

1. In a stave-dressing machine, the combination of two cutter-heads, parallel with each other means to rotate them, a feed-mechanism consisting substantially of two chains which converge as they approach the cutter-heads, means on said chains which support and hold the staves while being dressed which means by reason of the convergency of the chains are caused to engage with the staves and means to support, guide and actuate the chains, all as substantially shown and described.

2. In a stave-dressing machine, the combination of two cutter-heads, parallel with each other means to rotate them, a feed-mechanism consisting substantially of two chains which converge as they approach the cutter-heads, means on said chains which support and hold the staves while being dressed, which means by reason of the convergency of the chains are caused to engage with the staves means to support, guide and actuate the chains and a table on which the staves are supported in a manner which enables the feed-mechanism to engage them in a position which is proper for the cutter-heads to act upon them, all as substantially shown and described.

3. In a stave-dressing machine, the combination of suitable cutter-heads, means to rotate them, a feed-mechanism consisting substantially of two chains, means to support, guide and actuate them, means secured to them which support and hold the staves while being dressed and curved guides 18, which cause the staves to pass through between the cutter-heads on a circle which substantially corresponds with the circle of the package for which the staves are intended, all as substantially shown and described.

4. In a stave-dressing machine, the combination of two cutter-heads, parallel with each other, means to rotate them, two chain-carriers which converge as they approach the cutter-heads, guides 18, and pulleys 19, which support the chain-carriers, means to actuate pulleys 19, and means to hold and support the staves while being dressed, which means by reason of the convergency of the chains are caused to engage with the staves all as substantially shown and described.

5. In a stave-dressing machine, the combination of two cutter-heads, means to rotate them, two converging chain-carriers, means to support, guide and actuate them, and grippers 16, connected to them, having fingers 15, extending beyond the teeth of the grippers, all as substantially shown and described.

6. In a stave-dressing machine, the combination of two cutter-heads, means to rotate them, two converging chain-carriers, means to support, guide and actuate them, grippers 16, connected to them and having fingers 15, extending beyond the teeth of the grippers for taking up the staves and a table which supports the staves on said fingers until the teeth of the grippers engage with them, all as substantially shown and described.

7. In a stave-dressing machine, the combination of suitable cutter-heads, means to rotate them, two chain-carriers provided with means to hold and support the staves while being dressed, means to support and actuate the chain-carriers, and curved guides 18, over and around which the former pass, said guides being closer together than the distance between the chains at the other end, whereby these latter are caused to converge, all as substantially shown and described.

In testimony whereof I affix my signature in presence of two witnesses.

DANIEL F. MILLER.

Witnesses:
A. G. HAIL,
GEO. W. WAIT.